(12) United States Patent
Park et al.

(10) Patent No.: US 9,104,420 B2
(45) Date of Patent: Aug. 11, 2015

(54) IMAGE FORMING APPARATUS, MICROCONTROLLER, AND METHODS FOR CONTROLLING IMAGE FORMING APPARATUS AND MICROCONTROLLER

(75) Inventors: Jin-kyu Park, Suwon-si (KR); Ji-won Jung, Suwon-si (KR); Ho-beom Park, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 528 days.

(21) Appl. No.: 13/444,180

(22) Filed: Apr. 11, 2012

(65) Prior Publication Data

US 2013/0042129 A1 Feb. 14, 2013

(30) Foreign Application Priority Data

Aug. 9, 2011 (KR) .............................. 2011-0079295

(51) Int. Cl.
*G06F 1/32* (2006.01)
(52) U.S. Cl.
CPC ........... *G06F 1/3275* (2013.01); *Y02B 60/1228* (2013.01); *Y02B 60/32* (2013.01)
(58) Field of Classification Search
CPC ... G06F 1/3275; Y02B 60/32; Y02B 60/1228
See application file for complete search history.

(56) References Cited

U.S. PATENT DOCUMENTS

| | | | |
|---|---|---|---|
| 5,999,021 A | 12/1999 | Jang | |
| 6,510,099 B1 | 1/2003 | Wilcox et al. | |
| 7,039,755 B1 | 5/2006 | Helms | |
| 7,986,580 B2 | 7/2011 | Fry et al. | |
| 2002/0184438 A1 | 12/2002 | Usui | |
| 2004/0165466 A1 | 8/2004 | Schaefer et al. | |
| 2005/0071543 A1 | 3/2005 | Ellis et al. | |
| 2005/0259493 A1 | 11/2005 | Walker | |
| 2007/0171750 A1 | 7/2007 | Oh | |
| 2007/0260867 A1 | 11/2007 | Ethier et al. | |
| 2009/0204837 A1 | 8/2009 | Raval et al. | |
| 2009/0222707 A1 | 9/2009 | Shin et al. | |

(Continued)

FOREIGN PATENT DOCUMENTS

| | | |
|---|---|---|
| KR | 10-2008-0083878 | 9/2008 |
| WO | 2009/140758 | 11/2009 |

OTHER PUBLICATIONS

International Search Report mailed Feb. 27, 2013 in International Patent Application No. PCT/KR2012/006345.
Written Opinion of the International Searching Authority mailed Feb. 27, 2013 in International Patent Application No. PCT/KR2012/006345.

(Continued)

*Primary Examiner* — M Elamin
(74) *Attorney, Agent, or Firm* — Staas & Halsey LLP (57) ABSTRACT

An image forming apparatus, a microcontroller, and methods for controlling the image forming apparatus and the microcontroller are provided. The microcontroller include: a memory controller which is connected to an external memory operating in a self-refresh mode if a normal mode changes to a low power mode and outputs a preset signal which is to cancel the self-refresh mode if the low power mode changes to the normal mode; a memory interface unit which transmits the preset signal to a main memory; and a signal detector which detects whether the preset signal has been output. Here, the memory controller powers off the memory interface unit if the normal mode changes to the low power mode and powers on the memory interface unit if the low power mode changes to the normal mode, and the output of the preset signal is detected by the signal detector.

25 Claims, 8 Drawing Sheets

(56) References Cited

U.S. PATENT DOCUMENTS

| | | |
|---|---|---|
| 2010/0162020 A1 | 6/2010 | Maule et al. |
| 2010/0232247 A1 | 9/2010 | Yamasaki |
| 2010/0325457 A1 | 12/2010 | Lachwani et al. |
| 2011/0148923 A1 | 6/2011 | Sadowski et al. |
| 2011/0225410 A1 | 9/2011 | Hung |
| 2011/0264934 A1 | 10/2011 | Branover et al. |

OTHER PUBLICATIONS

US Office Action issued Jul. 30, 2014 in U.S. Appl. No. 13/588,490.

U.S. Patent Final Office Action mailed Jan. 2, 2015 in copending U.S. Appl. No. 13/588,490.

U.S. Patent Office Action mailed May 20, 2015 in copending U.S. Appl. No. 13/588,490.

U.S. Appl. No. 13/588,490, filed Aug. 17, 2012, Jin-kyu Park et al., Samsung Electronics Co., Ltd.

IMAGE FORMING APPARATUS, MICROCONTROLLER, AND METHODS FOR CONTROLLING IMAGE FORMING APPARATUS AND MICROCONTROLLER

CROSS-REFERENCE TO RELATED APPLICATIONS

This application claims priority benefit from Korean Patent Application No. 10-2011-0079295, filed on Aug. 9, 2011, in the Korean Intellectual Property Office, the disclosure of which is incorporated herein by reference in its entirety.

BACKGROUND

1. Field

Apparatuses consistent with exemplary embodiments relate to an image forming apparatus, a microcontroller, and methods for controlling the image forming apparatus and the microcontroller, and more particularly, to an image forming apparatus which can realize a low power mode, a microcontroller, and methods for controlling the image forming apparatus and the microcontroller.

2. Description of the Related Art

Demands for low power of all types of electronic products have been reinforced. Therefore, if electronic products do not meet these demands, the electronic products cannot be sold due to regulations in spite of their high performances and competitive prices.

Current specifications of the Energy Star Program require that power between 1 W and 2 W should be consumed in a standby mode according to types of apparatuses. From now on, the Energy Star Program will require power consumption of 1 W or less even in a standby state in which a network service is possible. Therefore, all electronic companies mobilize several methods to achieve this requirement.

Also, consumers should not feel use inconveniences according to whether apparatuses are in a low power state or a normal operation state. This will be a core of competitiveness between technologies of apparatuses.

In order to achieve a low power standby mode, most companies access the following method. In other words, a main central processing unit (CPU) having a high performance and an auxiliary CPU consuming low power are constituted. A service is provided through the main CPU in a normal mode, when a system enters a standby mode due to a specific condition, the main CPU and an unnecessary system are powered off through the auxiliary CPU, and a service request is monitored through the auxiliary CPU. Also, when a user request a service, the auxiliary CPU applies power to the main CPU and auxiliary circuits to provide the service. In other words, a CPU of a small gate size is added besides existing CPU cores.

For example, a conventional system includes a main controller and a sub-controller which recognizes 10 receiving and wakeup processing events in a low power mode to apply power to the main controller. In this case, prices increase due to the installation of an additional chip, and additional circuit and software for communications between the main controller and the sub controller are required.

As another example, CPUs of a main controller and a sub controller are integrated into a System-on-chip (SOC). Also, the main controller controls Micro Channel Architecture (MAC), a universal serial bus (USB), a Fax, an input/output (I/O) port, etc. in a service mode, and the sub controller processes data of the MAC, the USB, the Fax, the I/O port, etc. in a low power mode. Even in this case, an additional CPU for low power is to be installed.

In order to achieve low power, power domains of internal modules are separated from one another to control in order to power on/off a particular block and power off an unused block. In particular, except for a sub controller and apparatuses for receiving events, other apparatuses are powered off.

However, reducing standby power by using this method reaches the limit. Therefore, an object for realizing low power has gradually extended from a controller to a peripheral connection apparatus. Besides a self refresh mode, there are various methods for realizing low power of a double data rate (DDR) memory that is a representative peripheral device. For example, there is a method for controlling to power off a pad of a DDR memory in a sleep mode.

In this case, instead of changing an existing system, a pad control circuit of a DDR memory is installed in the existing system to replace only a memory in order to achieve low power to some degree. However, in terms of a whole system, a pad of a C controller controlling the DDR memory cannot be controlled. Therefore, power loss occurring in that part cannot be prevented.

Also, if an interface unit is powered off in a low power mode, an occurrence of a particular event for changing a low power mode such as a self refresh mode to a normal mode interrupts smooth data communications. As a result, malfunctioning (data loss) may occur.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiment provide an image forming apparatus which powers off a memory interface unit of a controller in a low power mode to realize the low power mode, a microcontroller, and methods for controlling the image forming apparatus and the microcontroller.

According to an aspect of an exemplary embodiment, there is provided an image forming apparatus. The image forming apparatus may include: a main memory which operates in a self-refresh mode if a normal mode changes to a low power mode; and a main controller which include: a memory controller which, if the low power mode changes to the normal mode, outputs a preset signal which is to cancel the self-refresh mode; a memory interface unit which transmits the preset signal to the main memory; and a signal detector which detects whether the preset signal has been output, wherein if the normal mode changes to the low power mode, the memory controller powers off the memory interface unit, and if the low power mode changes to the normal mode, and the output of the preset signal is detected by the signal detector, the memory controller powers on the memory interface unit.

The image forming apparatus may further comprise CPU. If the low power mode changes to the normal mode, the CPU may control the memory controller to output the preset signal.

The preset signal may be at least one of a clock enable (CKE) signal, a power down exit signal, and a pad enable signal.

The memory interface unit may be a pad.

The pad may be a Stub Series Terminated Logic (SSTL) pad.

The signal detector may include a multiplexer (MUX) having a plurality of input terminals, and select and output one of a plurality of input signals input into the plurality of input terminals.

According to an aspect of another exemplary embodiment, there is provided a microcontroller which is connected to an external memory operating in a self-refresh mode if a normal mode changes to a low power mode. The microcontroller may include: a memory controller which, if the low power mode changes to the normal mode, outputs a preset signal which is to cancel the self-refresh mode; a memory interface unit which transmits the preset signal to a main memory; and a signal detector which detects whether the preset signal has been output, wherein the memory controller powers off the memory interface unit if the normal mode changes to the power mode and powers on the memory interface unit if the low power mode changes to the normal mode and the output of the preset signal is detected by the signal detector.

The microcontroller may further comprise CPU. If the low power mode changes to the normal mode, the CPU may control the memory controller to output the preset signal.

The preset signal may be at least one of a clock enable (CKE) signal, a power down exit signal, and a pad enable signal.

The memory interface unit may be a pad.

The pad may be a SSTL pad.

The signal detector may include a MUX having a plurality of input terminals, and select and output one of a plurality of input signals input into the plurality of input terminals.

According to an aspect of another exemplary embodiment, there is provided a method for controlling an image forming apparatus which includes a main memory which operates in a self-refresh mode if a normal mode changes to a low power mode, a memory controller which outputs a preset signal for cancelling the self-refresh mode if the low power mode changes to the normal mode, and a memory interface unit which transmits the preset signal to the main memory. The method may include: if the normal mode changes to the low power mode, powering off the memory interface unit; if the low power mode changes to the normal mode, checking whether the preset signal for cancelling the self-refresh mode of the main memory has been output; and if the output of the preset signal is detected, changing the memory interface unit to a power-on state.

The preset signal may be at least one of a clock enable (CKE) signal, a power down exit signal, and a pad enable signal.

The memory interface unit may be a pad.

The pad may be a SSTL pad.

The main controller may further include a signal detector which detects whether the preset signal has been output, wherein the signal detector includes a MUX having a plurality of input terminals, and selects and outputs one of a plurality of input signals input into the plurality of input terminals.

According to an aspect of another exemplary embodiment, there is provided a method for controlling a microcontroller which includes a memory controller which controls an external memory operating in a self-refresh mode if a normal mode changes to a low power mode and a memory interface unit which performs a communication with the external memory and performs a control operation by using the external memory in the normal mode. The method may include: if the normal mode changes to the low power mode, powering off the memory interface unit; and if the low power mode changes to the normal mode, and a preset signal is detected, powering on the memory interface unit, wherein the preset signal is a signal which is output from the memory controller to cancel the self-refresh mode of the external memory if the low power mode changes to the normal mode.

The preset signal may be at least one of a clock enable (CKE) signal, a power down exit signal, and a pad enable signal.

The memory interface unit may be a pad.

The pad may be a SSTL pad.

The microcontroller may further include a signal detector which detects the preset signal, wherein the signal detector includes a MUX having a plurality of input terminals, and selects and outputs one of a plurality of input signals input into the plurality of input terminals.

As described above, according to exemplary embodiments, standby power may be efficiently reduced.

Additional aspects of exemplary embodiments will be set forth in the detailed description, or may be learned by practicing exemplary embodiments.

BRIEF DESCRIPTION OF THE DRAWINGS

The above and/or other aspects will be more apparent by describing in detail exemplary embodiments, with reference to the accompanying drawings, in which.

DETAILED DESCRIPTION

Reference will now be made in detail to embodiments, examples of which are illustrated in the accompanying drawings, wherein like reference numerals refer to like elements throughout. Embodiments are described below by referring to the figures.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure exemplary embodiments with unnecessary detail.

Figure 1A:
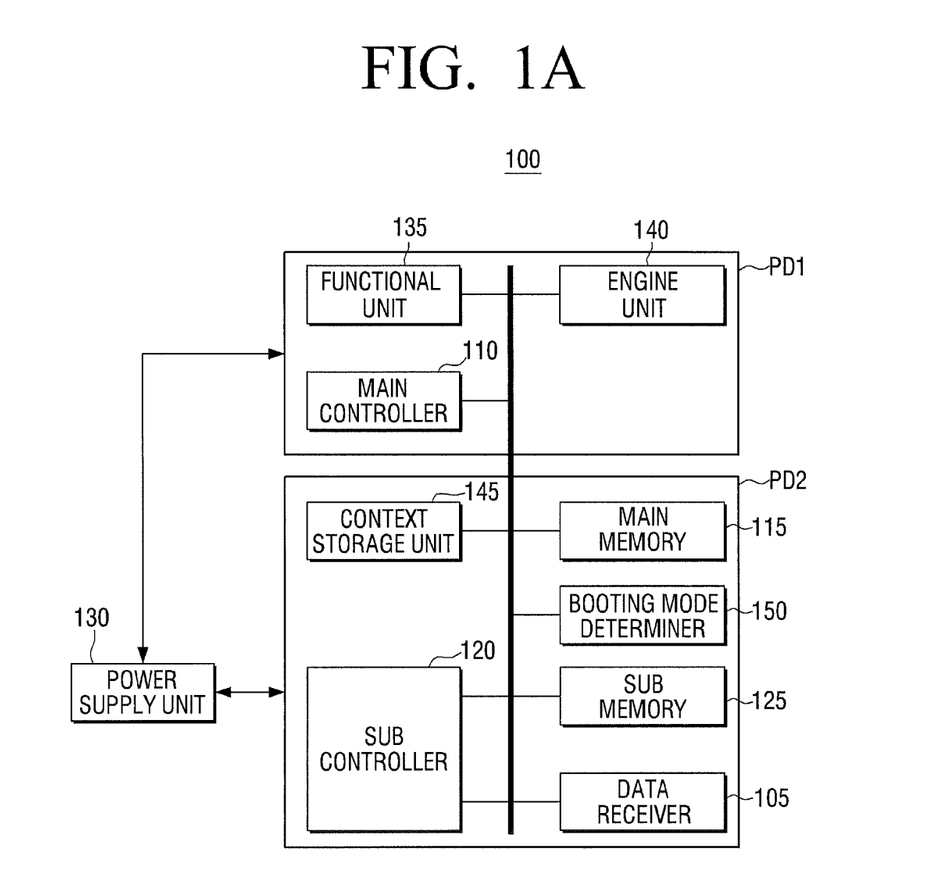
FIGS. 1A and 1B are block diagrams illustrating a structure of an image forming apparatus according to an exemplary embodiment.

FIG. 1A is a block diagram illustrating a structure of an image forming apparatus 100 according to an exemplary embodiment.

Referring to FIG. 1A, the image forming apparatus 100 includes a data receiver 105, a main controller 110, a main memory 115, a sub controller 120, a sub memory 125, a power supply unit 130, a functional unit 135, an engine unit 140, a context storage unit 145, and a booting mode determiner 150.

Here, the image forming apparatus 100 may be generally realized as a printer, a copier, a scanner, a fax machine, a multifunction peripheral (MFP) having compound functions thereof, etc.

The image forming apparatus 100 includes first and second power domains PD1 and PD2 which are separately supplied with power through different power supply lines. Here, a power domain refers to an area which is supplied with power through the same power supply line.

The first power domain PD1 includes the main controller 110, the functional unit 135, and the engine unit 140. Also, the second power domain PD2 includes the data receiver 105, the main memory 115, the sub memory 125, the sub controller 120, the context storage unit 145, and the booting mode determiner 150.

In the image forming apparatus 100, the main controller 110 and the sub controller 120 are disposed in a System-on-chip (SOC), and the sub controller 120 performs scan/engine/fax controls, etc. in a normal mode. For this purpose, a normal real-time operating system (OS) is used. Here, functions, such as scan/engine/fax, may be performed by the functional unit 135 and the engine unit 140. Also, the sub controller 120 is controlled by the main controller 110 in a low power mode service to change a mode in order to execute a low power service code, thereby performing a low power service.

Each of the main controller 110 and the sub controller 120 may be realized as one central processing unit (CPU). Therefore, hereinafter, the main controller 110 and the sub controller 120 will be referred to as a main CPU and a sub CPU, respectively.

Along with the main controller 110 and the sub controller 120, the data receiver 105, the main memory 115, the sub memory 125, the power supply unit 130, the functional unit 135, the engine unit 140, the context storage unit 145, and the booting mode determiner 150 may be disposed together in one SOC.

Alternatively, the main controller 110, the functional unit 135, and the engine unit 140 may be disposed in one SOC, and the data receiver 105, the sub controller 120, and the sub memory 125 may be disposed in a separate SOC. Also, the main memory 115 and the context storage unit 145 may be disposed outside the SOCs.

In this case, the sub controller 120 may be used for a different purpose in a normal mode and may be reset when the normal mode changes to a low power mode. In more detail, if the normal mode changes to the low power mode, the sub controller 120 is reset, stores micro firmware for the low power mode service in the sub memory 125, and operates in the low power mode.

Operations of elements of the image forming apparatus 100 will now be described in detail.

The data receiver 105 performs data communications with at least one external device. Here, the data receiver 105 may be realized as a communication module which interfaces with an external device such as a network, a Secure Digital Input/Output (SDIO), a universal serial bus (USB), a Serial Peripheral Interface (SPI), an Inter-Integrated Circuit (I2C), a General Purpose Input/Output (GPIO) (Sensor Input, etc.), a fax, or the like. Also, the at least one external device may be a host device such as a personal computer (PC) or the like or may be realized as a user terminal device, such as a mobile phone, a personal digital assistant (PDA), a USB or the like, or an external server.

The main controller 110 controls an overall operation of the image forming apparatus 100, in particular, performs a control operation by using the main memory 115, which will be described later, in the normal mode. In more detail, if a request signal for an image forming job is input in the low power mode, the main controller 110 changes the low power mode to the normal mode to enable the main memory 115 and perform a corresponding operation by using the main memory 115 which has been enabled.

For example, the main controller 110 may receive and process the image forming job in the normal mode. The main controller 110 may include a web server to provide a web service or may install a $3^{rd}$ party Application in an upper copier to provide a service. A general-purpose operating system (OS) such as Linux may be installed. Also, a real-time OS may be installed in a distribution product having a slow speed so that the main controller 110 directly controls scan/engine/fax.

In particular, if the normal mode changes to the low power mode, the main controller 110 copies context information into the context storage unit 145. If the low power mode changes to the normal mode, the main controller 110 is booted by using the context information stored in the context storage unit 145. Here, the context information may be CPU context information which is lost when power of the first power domain PD1 is interrupted. Also, the context information may include context information of other elements which is lost when the power of the first power domain PD1 is interrupted.

Figure 1B:
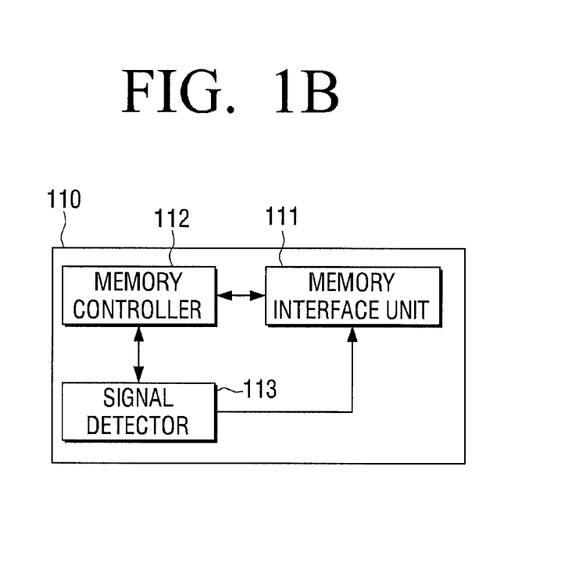

As shown in FIG. 1B, the main controller 110 may be realized to include a memory interface unit 111, a memory controller 112, and a signal detector 113.

The memory interface unit 111 communicates with the main memory 115.

If the normal mode changes to the low power mode, the main controller 110 powers off the memory interface unit 111. If the low power mode changes to the normal mode, and a preset signal is detected, the main controller 110 may power on the memory interface unit 111. Here, the memory interface unit 111 may be realized as a pad, e.g., a Stub Series Terminated Logic (SSTL) pad.

Also, the preset signal may be a signal which to change the main memory 115 from the low power mode to the normal mode. In more detail, the preset signal may be a signal which is to cancel a self-refresh mode of the main memory 115. For example, the preset signal may be a clock enable (CKE) signal which is output from the main controller 110 but is not limited thereto. Therefore, the preset signal may be a power down exit signal or a pad enable signal.

The memory controller 112 controls the memory interface unit 111. Here, the memory controller 112 may be realized as a double data rate (DDR) controller.

The signal detector 113 detects the preset signal. Here, the signal detector 113 may be realized as a SSTL pad hardware (H/W) control logic.

In more detail, the signal detector 113 may include a multiplexer (MUX) having a plurality of input terminals, and select and output one of a plurality of input signals input into the plurality of input terminals.

Here, the plurality of input terminals may include a pad enable signal input terminal, a clock enable signal input terminal, and a mode signal input terminal. Also, the MUX may output one of a pad enable signal and a clock enable signal according to a mode signal.

As described above, if the normal mode changes to the low power mode, the memory controller 112 powers off the memory interface unit 111. If the low power mode changes to the normal mode, and the preset signal is detected by the signal detector 113, the memory controller 112 powers on the memory interface unit 111.

In the low power mode, the sub controller 120 performs a control operation by using the sub memory 125. In the normal mode, the sub controller 120 drives the engine unit 140 under control of the main controller 110 to perform the image forming job.

In more detail, in the normal mode, the sub controller 120 performs a service of a part requiring a real-time control such as engine/scan/fax controls. Since a real-time property of this service is important, this service is controlled by using a real-time OS.

When entering the low power mode, the sub controller 120 may perform an operation according to the preset signal by using the sub memory 125 with maintaining the low power mode. The preset signal may be a state request signal of the image forming apparatus 100 which is generated by an application of a host device (not shown) in a maintainable state of the low power mode. For example, the preset signal may be a signal which is generated by a smart panel of the host device. Here, the smart panel refers to a panel which displays a state of an image forming apparatus in the host device, e.g., which may periodically checks the state of the image forming apparatus through a USB control communication. A user may check a printing state, a paper sheet state, a toner state, a power on/off state, etc. of the image forming apparatus through the smart panel in the host device.

When entering the low power mode, the main controller 110 requests a low power service change of the sub controller 120, and the sub controller 120 changes a low power mode changeable state and informs the main controller 110 of a state thereof. In this case, if a mode change is impossible due to an engine state, the sub controller 120 may transmit a change impossibility message to the main controller 110.

If the low power service starts, the sub controller 120 powers off the first power domain PD1, changes a dynamic random access memory (DRAM) to a self-refresh state to change the DRAM to a low power state, and performs the low power service, i.e., a wakeup event monitoring service.

Here, the normal mode refers to a mode in which the image forming apparatus 100 performs a normal operation. Also, the low power mode refers to an operation mode which is to interrupt or minimize power supply of most modules in order to minimize power consumed when a system does not perform any job.

In the low power mode, in order to realize lower standby power (1 W or less), a main memory (in general, an external DRAM) is changed to a self-refresh state, and an unused internal memory (in general, an internal static random access memory (SRAM)) of a SOC drives a program. For example, a SRAM may use a small capacity memory of about 128 KB. However, a synchronous dynamic random access memory (SDRAM) may be used or a ROM may be additionally used along with a SRAM or a SDRAM.

The main memory 115 is a main memory which is used in an operation of the normal mode and may be realized as a nonvolatile memory. For example, the main memory 115 may be a DR memory, a DRAM, or the like. The main memory 115 may be realized a volatile memory which is necessary when a main CPU is driven and operates in a self-refresh mode in the low power mode and thus consumes only minimum power.

As described above, the main memory 115 may be controlled by the main controller 110. Also, if the image forming apparatus 100 changes from the low power mode to the normal mode, the main memory 115 may change from the self-refresh mode to the normal mode according to the preset signal output from the main controller 110.

Since the main memory 115 belongs to the second power domain PD2, the main memory 115 is not powered off even in the low power mode. Therefore, if CPU-related information stored in the context storage unit 145 is restored when returning to the normal mode, the main memory 115 may return to a right previous performance mode, thereby enabling rapid booting.

The sub memory 125 is installed in a SOC and may be used as a storage space for storing program codes and data of the sub controller 120 in the low power mode. For example, in the case of a USB, a program code for controlling a low power mode may include at least one of a routine for determining whether a signal has been input into the data receiver 105, a routine for performing an operation according to a USB control signal, and a routine necessary in a wakeup for changing to a normal mode.

In this case, the sub memory 125 may be realized as at least one of a SRAM and a SDRAM. Also, the sub memory 125 may be realized as a RAMBus, a DRAM, a DDR-SDRAM, or the like.

For example, the sub memory 125 may be realized so that the sub controller 120 re-uses a SRAM used by the functional unit 135 of the SOC in the lower power mode. However, this is only an exemplary embodiment, and the sub memory 125 may be a memory outside the SOC not a SRAM inside the SOC or may be realized by using an external ROM and an internal minimum size SRAM.

Also, at least one of a ROM and a flash memory may be used to store a code necessary for realizing the low power mode.

According to an exemplary embodiment, the sub memory 125 may be realized as a SRAM. In this case, the SRAM may be used to copy and execute a code which is stored in a DRAM, a ROM, a flash memory, or the like and is necessary for realizing the low power mode.

Also, the sub memory 125 may be used along with the main memory 115 in the operation of the normal mode. In other words, a SRAM which is used as a buffer when processing an image in the normal mode may be reused as the sub memory 125 in the low power mode.

The power supply unit 130 supplies power to the image forming apparatus 100.

In more detail, the power supply unit 130 supplies power to the first and second power domains PD1 and PD2 in the normal mode. Also, in the low power mode, the power supply unit 130 interrupts the supply of power to the first power domain PD1 and supplies power only to the second power domain PD2.

In the above-described exemplary embodiment, the main controller 110 and the sub controller 120 are respectively realized as CPUs to control the image forming apparatus 100. However, a main CPU (not shown) and a sub CPU (not shown) may be realized to transmit commands to a main controller (not shown) and a sub controller (not shown) so that elements perform corresponding operations.

Also, the image forming apparatus 100 may include a phase-locked loop (PLL) unit (not shown) which generates different operation frequencies. The PLL unit may provide the generated operation frequencies to the main controller 110, the sub controller 120, the main memory 115, and the sub memory 125.

The functional unit 135 performs various functions, such as processing of an image and compressing or decompressing of the image, which are to be processed by the engine unit 140 to perform image forming jobs such as printing, copying, scanning, etc.

An operation module (not shown) may include various functional modules which are not included in the functional unit 135 due to a capacity limit of the functional unit 135. The operation module may include at least one functional modules, and each of the at least one functional modules may be realized as a single chip.

The functional unit 135 and the engine unit 140 are located in the first power domain PD1 along with the main controller 110 to be powered off by the power supply unit 130 if an operation is not necessary like when changing to the low power mode.

If the main controller 110 satisfies preset conditions, the main controller 110 changes from the normal mode to the low power mode. For example, a command may not be transmitted for a preset time. However, this is only an exemplary embodiment, and various mode change events may exist.

As described above, if the main controller 110 is to change from the normal mode to the low power mode, the main controller 110 may copy a program for controlling the low power mode from the main memory 115 into an executable area of the sub memory 125 or may copy a program stored in an additional ROM, flash memory, or the like into the executable area of the sub memory 125. Therefore, the program has a smaller capacity than a USB program which is stored in the main memory 115 used in the normal mode. If copying of the code is completed, the main controller 110 interrupts the supply of power to the first power domain PD1 and enters the low power mode.

The code stored in a flash memory or a ROM may be copied into a DRAM when booting or may be copied into a SRAM when entering the low power mode.

If the sub controller 120 satisfies preset conditions, the sub controller 120 changes from the low power mode to the normal mode. For example, in the case of a printer, if an event of a panel key input, a printing service request, a fax ring, or the like exists, the sub controller 120 may change from the low power mode to the normal mode.

In general, when returning from the low power mode to the normal mode, a booting time is equal to an initial booting time (a booting process may include a DRAM initialization, copying of a code from a ROM into a DRAM, a HAN initializing process, OS booting, a service program start, etc.). The main factor is as follows. Power of a first power domain including a main controller (not shown) and a DRAM (not shown) is turned off to change to the low power mode. Therefore, powers of the main controller and the DRAM are turned off. As a result, the booting time undergoes the same process as an initial booting process when applying power.

However, as described above, according to an exemplary embodiment, the main memory 115 used in the normal mode is disposed in the second power domain PD2 which is supplied with power through a different line from the first power domain PD1 in which the main controller 110 is disposed. Therefore, power of the main memory 115 is not turned off but is maintained to be changed to a self-refresh state, thereby maintaining contents of the main memory 115. As a result, although power of a DRAM is switched off, power consumption between 1 W and 2 W is lowered to 200 mW or less, thereby achieving low power.

Although data stored in the main memory 115 is maintained, power is re-applied to the main controller 110 after power of the first power domain PD1 is turned off, i.e., switched off. Therefore, a performance context of the main controller 110 may be lost. For example, if the main controller 110 is realized as an ARM, a performance context may include a register set, a state register, set values of IP blocks of a SOC, etc. For reference, an ARM CPU has a similar clock to a CPU of a desktop PC and very lower power consumption between 40 mW and 450 mW than the CPU of the desktop PC.

In the image forming apparatus 100 of FIG. 1, when changing the low power mode, the main controller 110 stores necessary performance context information of the main controller 110, the functional unit 135, and the engine unit 140, which is lost when interrupting the supply of power to the first power domain PD1, in the context storage unit 145 of the second power domain PD2. Therefore, since the low power mode is restored to a state before changing to the low power mode, by using contexts stored in the context storage unit 145, re-booting is rapidly performed.

The context storage unit 145 is a space which is to store information of an element of the first power domain PD1 which is lost when the first power domain PD1 is powered off by the power supply unit 130 and then is restored later.

The context storage unit 145 may be a DRAM or any memory, such as a NAND memory, a NOR memory, a SPI memory, a SRAM, a memory of a SOC, or the like, which stores information which is not lost when the first power domain PD1 is powered off. For example, main backup information may be information of an ARM CPU such as a register set and a state register of the ARM CPU or an IP information set value of a SOC.

If booting is performed, the booting mode determiner 150 determines whether the booting is normal mode booting or the low power mode returns to the normal mode. Here, the normal mode booting refers to re-booting performed by re-applying power to the main controller 110 through the power supply unit 130. Therefore, the booting mode determiner 150 may be realized as a register which may store corresponding information in a SOC.

If the booting mode determiner 150 determines that a booting mode is a low power returning mode, the main controller 110 reads a register value of the booting mode determiner 150 before a PLL/DRR is initialized. Therefore, if the booting mode is the normal mode booting, the main controller 110 performs a normal booting process.

If the booting mode determiner 150 determines that the booting mode is the low power returning mode, the main controller 110 restores a CPU operation mode register and a state register from the context storage unit 145 and returns to a last performance point in order to enable booting within several ms. In other words, the booting mode determiner 150 skips a process of initializing the PLL/DDR, cancels the main memory 115 from the self-refresh mode, and uses information stored in the context storage unit 145 in order to immediately return to a previous performance state (a state previous to a change to the low power mode).

The booting mode determiner 150 may be realized to store a booting mode by using a register and may determine a mode through an input of a General-Purpose Input/Output (GPIO) pin. Therefore, the booting mode determiner 150 prevents the main controller 110 from re-performing a reset vector and thus performing the same process as a system power applying booting process.

If booting is performed in the low power mode when the low power mode changes to the normal mode, the main memory 115 is to escape from the self-refresh state. However, the main controller 110 may end the self-refresh mode with booting or the sub controller 120 may end the self-refresh mode of the main memory 115.

A process controller (not shown) may control the sub controller 120 when entering the low power mode. In more detail, when changing to the low power mode, the processor controller (not drawn) may change the main memory 115 to the self-refresh mode and control to interrupt the supply of power to the first power domain PD1.

As described above, in an image forming apparatus, one sub controller is used to perform real-time job processing (scan, fax, engine controls) in a normal mode and perform a low power standby mode service, i.e., wakeup event monitoring, a network packet response (an Address Resolution Protocol (ARP), an Internet Control Message Protocol (ICMP), an apparatus state query response), an apparatus state response service by using a USB, in a low power mode.

A relationship between the image forming apparatus 100 of FIG. 1 and a host device (not shown) will now be described in brief.

The host device may be representatively realized as a PC or may be realized as various types such as a personal digital assistant (PDA), a portable multimedia player (PMP), a television (TV), a server, etc.

The host device includes an application (not shown) and a host controller (not shown).

The application may be software (SAN) which supports various data communication functions in an OS.

The host controller may include all types of SAN or H/W which is to connect the image forming apparatus 100 to the host device.

The host device may further include a printer driver (not shown) which transforms printing data written by an application program into a printer language which may be interpreted by the image forming apparatus 100. Here, the printer driver may be included in the host controller. The host device may include normal elements such as an input unit (not shown), a display unit (not shown), etc.

Elements of FIG. 1 and their arrangement orders are only an exemplary embodiment. Therefore, one of the elements may be deleted or another element may be added and the arrangement orders of the elements may be changed.

Figure 2:
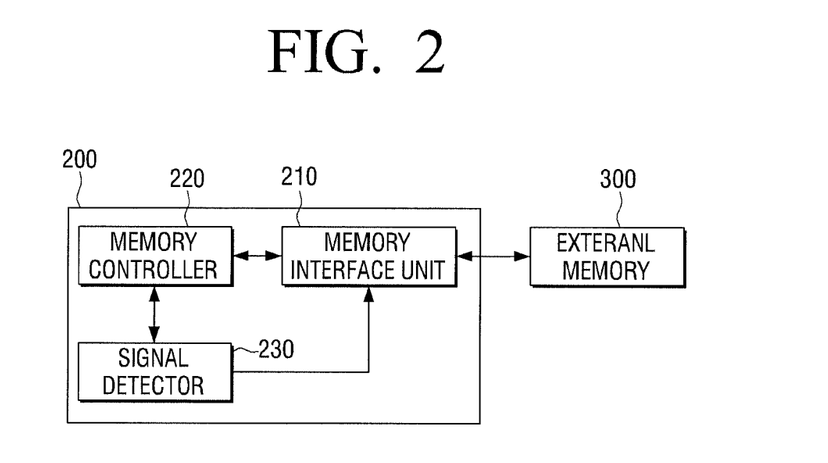
FIG. 2 is a block diagram illustrating a structure of a microcontroller according to an exemplary embodiment.

FIG. 2 is a block diagram illustrating a structure of a microcontroller 200 according to an exemplary embodiment. Here, the microcontroller 200 may be realized as the main controller 110 of FIG. 1A, and an external memory 300 may be realized as the main memory 115 of FIG. 1A.

Referring to FIG. 2, the microcontroller 200 includes a memory interface unit 210, a memory controller 220, and a signal detector 230.

The microcontroller 200 may perform a control operation in a normal mode by using the external memory 300. Here, the external memory 300 may be realized as the main memory 115 of FIG. 1A, e.g., may be realized as a DDR memory.

The memory interface unit 210 communicates with the external memory 300. Here, the memory interface unit 210 may be a pad, e.g., a SSTL pad.

The memory controller 220 controls the external memory 300. Here, the memory controller 220 may be realized as a DDR controller.

The signal detector 230 detects a preset signal output from the memory controller 210. Here, the preset signal may be at least one of a clock enable (CKE) signal, a power down exit signal, and a pad enable signal.

Figure 4:
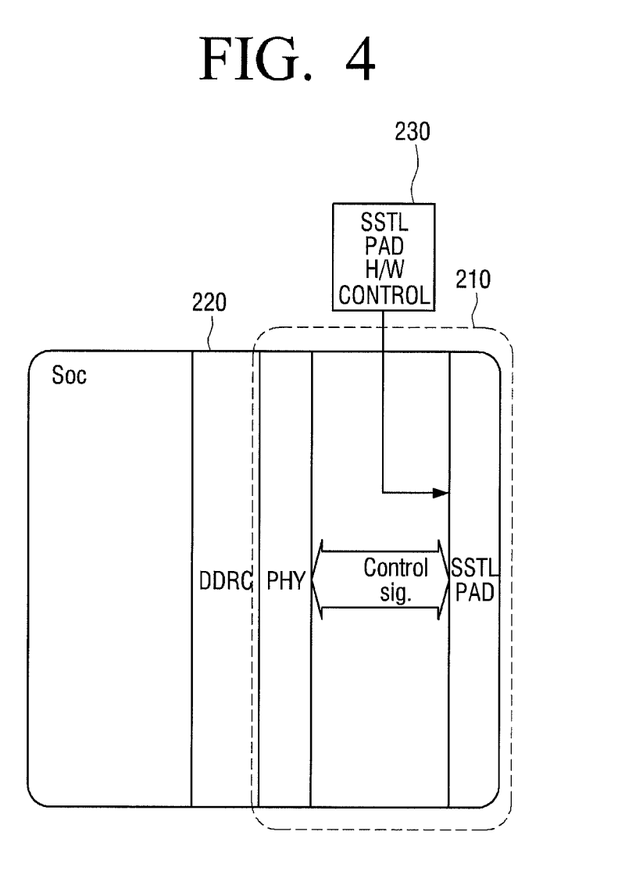
FIG. 4 is a view illustrating a detailed structure of a memory interface of FIG. 3.

Also, if the memory interface unit 210 is realized as the SSTL pad, the signal detector 230 may be realized as SSTL pad NM/control logic shown in FIG. 4.

When the normal mode changes to a low power mode, the external memory 300 operates in a self-refresh mode. When the low power mode changes to the normal mode state, the external memory 300 operates to change to the normal mode according to the preset signal output from the memory controller 220.

In this case, when the normal mode changes to the low power mode, the memory controller 220 powers off the memory interface unit 210. If the preset signal is detected when the low power mode changes to the normal mode, the memory controller 220 powers off the memory interface unit 210.

The signal detector 230 includes a MUX having a plurality of input terminals, and selects and outputs one of a plurality of input signals input into the plurality of input terminals. Here, the plurality of input terminals may include a pad enable signal input terminal, a clock enable signal input terminal, and a mode signal input terminal.

In this case, the MUX may select and output one of the pad enable signal and the clock enable signal according to a mode signal. The signal detector 230 may change on/off states of the memory interface unit 210 according to a signal output as described above.

In the above-described exemplary embodiment, one of the pad enable signal and the clock enable signal is selected, but this is only an exemplary embodiment. Therefore, instead of the clock enable signal, another particular signal, such as a power down exit signal or the like, may be input into the MUX.

According to another exemplary embodiment, besides the pad enable signal, the another particular signal may be a signal which is output by combining a plurality of particular signals.

Figure 3:
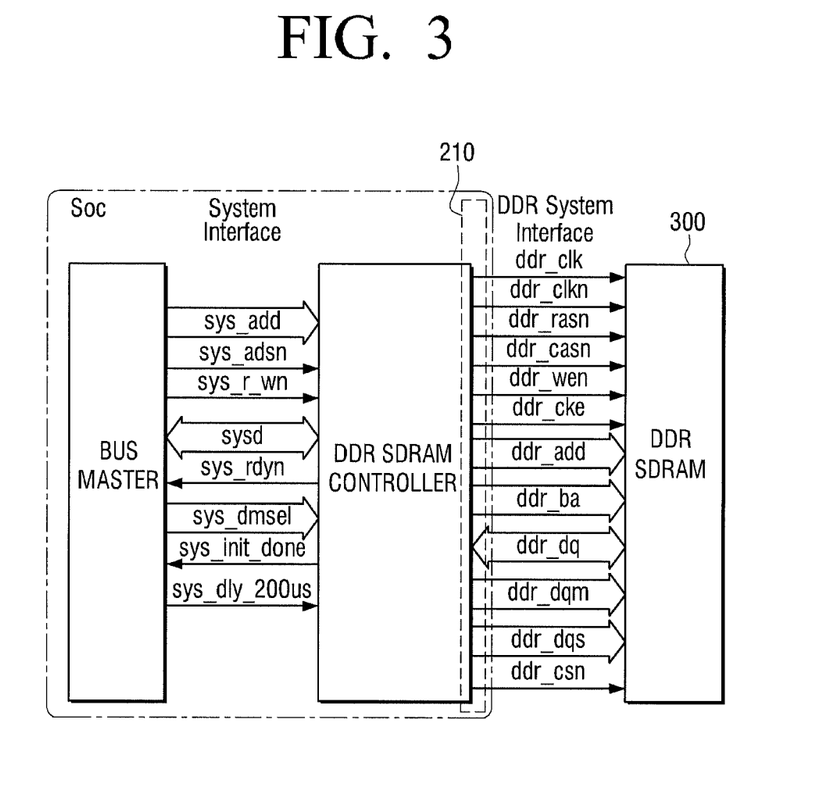
FIG. 3 is a view illustrating a microcontroller according to an exemplary embodiment.

FIG. 3 is a view illustrating a realization of a microcontroller according to an exemplary embodiment.

As shown in FIG. 3, the microcontroller may include a main controller (an SOC) having a memory controller and a memory interface unit 210 (a DDR System Interface) which is installed in the main controller (SOC). The microcontroller communicates with an external memory (a DDR memory) through the memory interface unit 210 (DDR System Interface). Here, the memory interface unit 210 (DDR System Interface) may be realized as a SSTL pad.

Also, although not shown in FIG. 3, the microcontroller may include a combinational logic circuit which controls the memory interface unit 210 (DDR System Interface).

In more detail, if the microcontroller returns from a low power mode to a normal mode, the microcontroller generates a preset signal to return the external memory (DDR memory) to a normal state. In this case, the microcontroller may detect the preset signal to automatically return the memory interface unit 210 (DDR System Interface) to the normal state.

Therefore, although the microcontroller operates the memory interface unit 210 (DDR System Interface) in a power-off (power-down) state for the low power mode in low power mode driving, the microcontroller may automatically return the memory interface unit 210 to the normal state. In other words, in the low power mode driving, the microcontroller may operate the memory interface unit 210 of the microcontroller related to a memory unit in the power-off (power-down) state, thereby reducing power consumption of the memory interface unit 210.

FIG. 4 is a view illustrating a detailed structure of the memory interface unit 210 of FIG. 3.

Referring to FIG. 4, the memory interface unit 210 may be a driven unit which is controlled by a combinational logic circuit (SSTL pad H/W control 230 to operate in a low power mode. In other words, the memory interface unit 210 operates as one of elements of the main controller (SOC) having the memory controller as follows. Hereinafter, the memory controller will be realized as a DDR controller 220, and an external memory will be realized as a DDR memory (not shown).

As shown in FIG. 4, the DDR controller 220 outputs control signals which are to operate the DDR memory. The output control signals are not simply directly connected to a pin of the DDR memory but are connected to the SSTL pad through a physical interface unit (PHY).

In other words, the DDR controller 220 and the DDR memory are not directly connected to each other but are connected to each other through a physical interface unit (the PHY and the pad). This is a structural element of the SCO, and any controller has the same shape.

In this case, for a low power operation, the memory interface unit (pad) 210 which continuously consumes power is also one of elements which are to be controlled. Therefore, a preset signal, which shows a definite difference between a low power mode and a normal mode, e.g., a CKE signal, is detected by the combinational logic circuit (SSTL pad H/W control) 230 so that the pad automatically is restored to a normal state.

In more detail, if the DDR memory enters a sleep mode such as a self-refresh mode, S/W may control to power off a SSTL pad connected to the DDR memory along with other pads. After a low power standby state ends, the memory interface unit 210 returns to the normal state as follows.

Figure 5A:
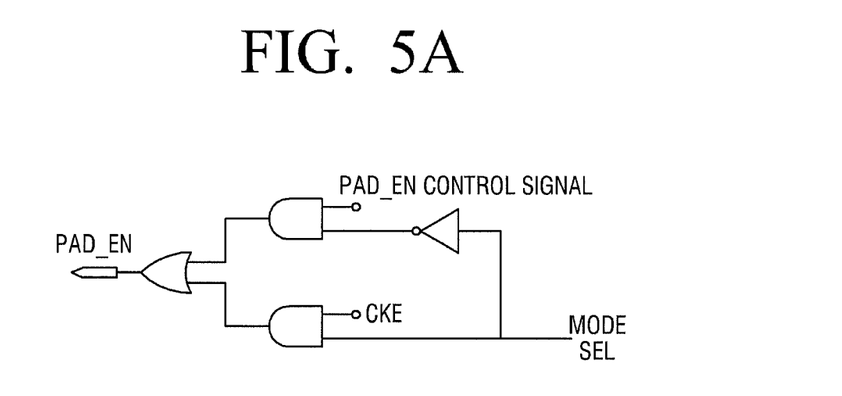
FIGS. 5A and 5B are circuit diagrams illustrating a structure of a memory controller according to an exemplary embodiment.
Figure 5B:
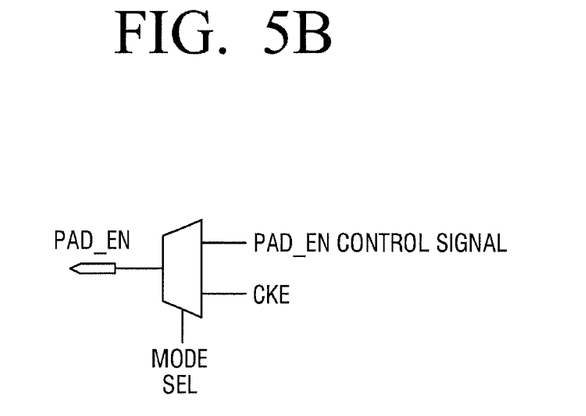

FIGS. 5A and 5B are circuit diagrams illustrating a structure of a memory controller according to an exemplary embodiment.

The memory controller shown in FIG. 5A may be realized as an H/W control logic used for the pad control shown in FIG. 4.

As shown in FIG. 5A, the H/W control logic used for the pad control, i.e., the SSTL pad HAN control logic monitors a CKE signal and automatically turns on the pad through an EN terminal of the pad to drive the DDR memory in the normal mode without any problem if the CKE signal transits to a high state.

However, a MODE SEL may be added for compatibility with an existing apparatus. In other words, if a register of the MODE SEL is set to 0, a PAD_EN signal is by passed to enable the SSTL pad so that a problem does not occur in an existing memory operation.

According to an exemplary embodiment, if the register of the MODE SEL is set to 1, the SSTL pad is automatically turned on through a detection of a preset signal (CKE). In other words, without a particular control operation, the pad control H/W detects the preset signal (CKE) generated by the memory controller to change a memory unit from the low power mode to the normal mode and enables the PAD_EN terminal so that the pad is automatically turned on.

FIG. 5B is a view illustrating the memory controller of FIG. 5A which is simplified.

Figure 6:
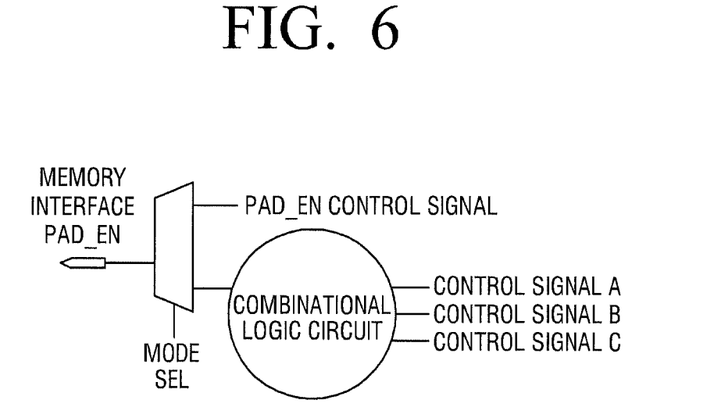
FIG. 6 is a view illustrating a structure of a memory controller according to another exemplary embodiment.

FIG. 6 is a view illustrating a structure of a memory controller according to another exemplary embodiment.

As shown in FIG. 6, exemplary embodiments may be applied to a case where not a DDR memory but an arbitrary memory unit returns from a low power mode to a normal mode according to a plurality of preset signals.

For example, if an arbitrary memory unit returns from a low power mode to a normal mode according to a plurality of preset signals A, B, and C, at least one of the plurality of preset signals A, B, and C may be detected. As shown in FIG. 6, the corresponding signals A, B, and C detected by a combinational logic circuit may be combined and output. Therefore, when changing to the normal mode, the PAD_EN terminal of the memory interface unit of the microcontroller may be enabled.

Figure 7:
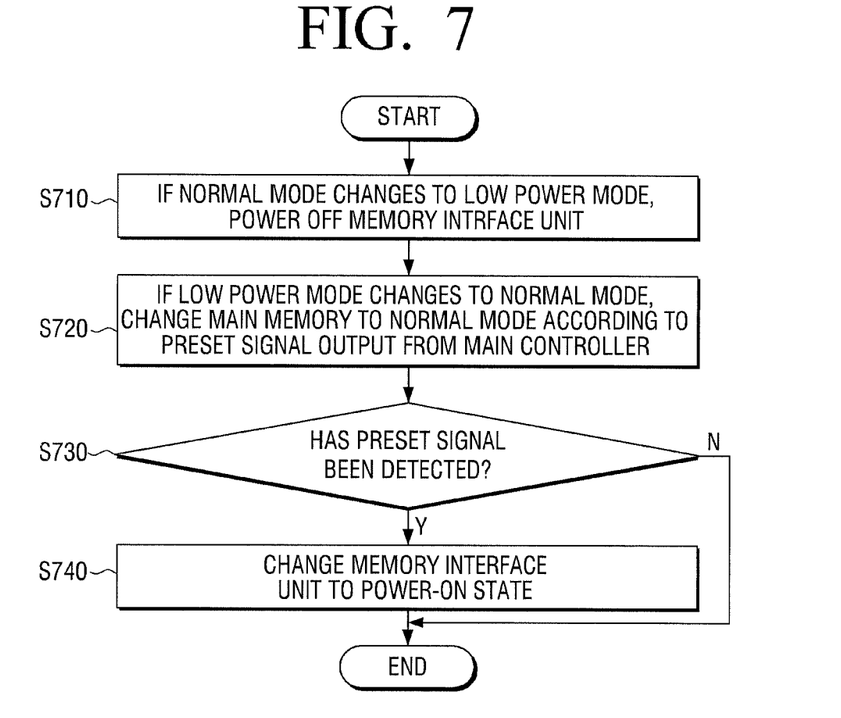
FIG. 7 is a flowchart illustrating a method for controlling an image forming apparatus according to an exemplary embodiment.

FIG. 7 is a flowchart illustrating a method for controlling an image forming apparatus according to an exemplary embodiment.

In the method of FIG. 7, when the image forming apparatus changes from a normal mode to a low power mode, the image forming apparatus may include a main memory which operates in a self-refresh mode when changing from a normal mode to a low power mode and a main controller which performs a control operation by using the main memory in the normal mode and includes a memory interface unit relaying a communication with the main memory.

Referring to FIG. 7, in operation S710, when changing from the normal mode to the low power mode, the memory interface unit is powered off.

In operation S720, when the low power mode changes to the normal mode, the main memory changes to the normal mode according to a preset signal output from the main controller.

In operation S730, a determination is made as to whether the preset signal has been detected. Here, the preset signal may be a CKE signal generated by the memory controller but is not necessarily limited thereto. Therefore, the preset signal may be a power down exit signal, a pad enable signal, or the like.

If it is determined in operation S730 that the preset signal has been detected, the memory interface unit changes to a power-on state in operation S740. Here, the memory interface unit may be a pad, e.g., a SSTL pad.

Also, the preset signal may be detected by a signal detector of the main controller. In this case, the signal detector may include a MUX having a plurality of input terminals, and select and output one of a plurality of input signals input into the plurality of input terminals.

A method for controlling a microcontroller according to an exemplary embodiment will be realized as follows. Here, the microcontroller may include a memory controller which controls an external memory operating in a self-refresh mode when changing from the normal mode to the low power mode and a memory interface unit which performs communications with the external memory. Also, the microcontroller may perform a control operating by using the external memory in the normal mode.

When the normal mode changes to the low power mode, the microcontroller may power off the memory interface unit.

If the low power mode changes to the normal mode, and the preset signal is detected according to a preset event, the microcontroller may power on the memory interface unit. Here, the preset signal may be a signal which is output from the memory controller to change the main memory to the normal mode when the low power mode changes to the normal mode. For example, the preset signal may be at least one of a clock enable (CKE) signal, a power down exit signal, and a pad enable signal.

The memory interface unit may be a pad, e.g., a SSTL pad.

Also, the microcontroller may further include a signal detector which is to detect the preset signal. Here, the signal detector may include a MUX having a plurality of input terminals, and select and output one of a plurality of input signals input into the plurality of input terminals.

Figure 8:
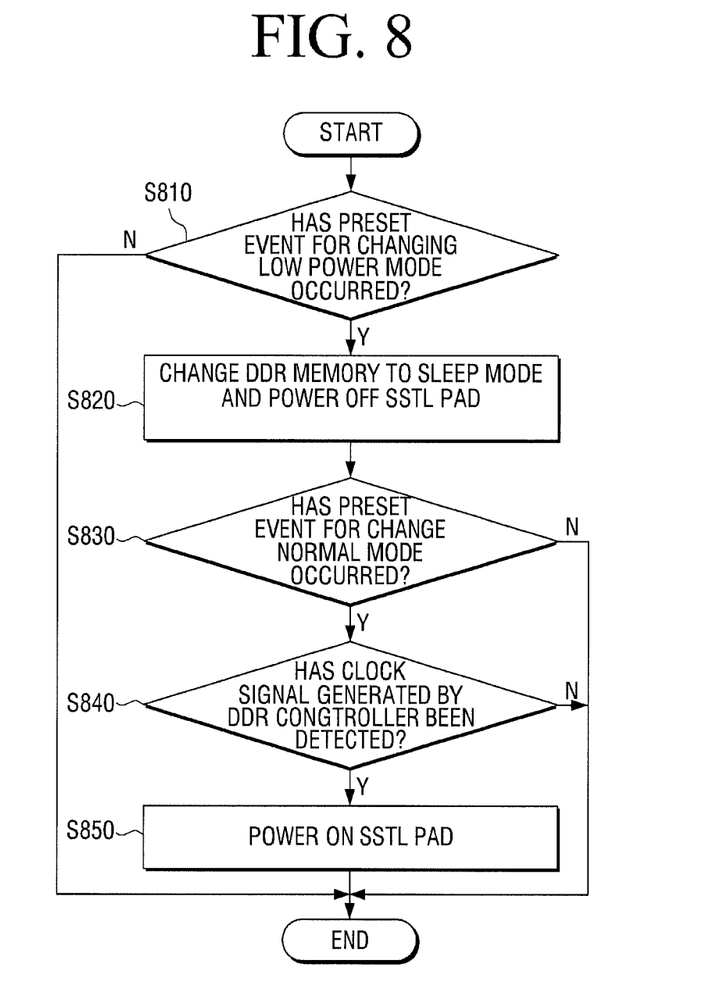
FIG. 8 is a flowchart illustrating a method for controlling a microcontroller according to an exemplary embodiment.

FIG. 8 is a flowchart illustrating a method for controlling a microcontroller according to an exemplary embodiment.

In the method of FIG. 8, for the descriptive convenience, the main memory 115 of FIG. 1A is realized as a DDR memory, the memory interface unit 111 is realized as a SSTL pad, the memory controller 112 is realized as a DDR controller, and the signal detector 113 is realized as a SSTL pad H/W control logic.

In operation S810, a determination is made as to whether a preset event for changing a low power mode has occurred. If it is determined in operation S810 that the preset event has occurred, in operation S820, the DDR memory changes to a sleep mode, and the SSTL pad is powered off.

In operation S830, a determination is made as to whether a preset event such as a job reception for changing the low power mode to a normal mode has occurred. If it is determined in operation S830, in operation S840, the SSTL pad H/W control logic checks whether a CLK signal generated by the DDR controller has been detected.

If it is determined in operation S840 that the CLK signal has been detected, in operation S850, the SSTL pad is powered off.

Therefore, the memory interface unit, which performs communications with respect to a memory changing to the sleep mode in a low power mode operation, may be powered off. As a result, standby power may be efficiently reduced to realize standby power of 1 W or less.

One or more image processing methods according to the above-described exemplary embodiments may be recorded in a non-transitory computer readable recording medium including computer program instructions (computer readable instructions) to implement various operations embodied by a computer or other processing devices. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. The computer program instructions may be executed by one or more processors, controllers, or processing devices. The computer-readable media may also be embodied in at least one application specific integrated circuit (ASIC) or Field Programmable Gate Array (FPGA)

Various exemplary embodiments may be applied to various communication methods, e.g., a network communication, a USB, Bluetooth, a High Definition Multimedia Interface (HDMI), a Peripheral Component Interconnect (PCI) express, Ethernet, ZigBee, FireWire, CAN, Zigbee, IEEE 1394, PS/2, an Accelerated Graphics Port (AGP), an Industry Standard Architecture (ISA), a Micro Channel Architecture (MAC), an Extended Industry Standard Architecture (EISA), a Video Electronics Standard Architecture (VESA), etc.

Exemplary embodiments exemplify an image forming apparatus, but this is an exemplary embodiment. Therefore, the same principle and structure may be applied to other electronic apparatuses to which exemplary embodiments may be applied. For example, a microcontroller and a memory controlled by the microcontroller may be applied to all types of apparatuses require designs of low power structures, e.g., mobile apparatuses, etc.

Although a few exemplary embodiments have been shown and described, it would also be appreciated by those skilled in the art that changes may be made in these embodiments without departing from the principles and spirit of the disclosure, the scope of which is defined in the claims and their equivalents.

What is claimed is:

1. An image forming apparatus comprising:
   a main memory which operates in a self-refresh mode if a normal mode changes to a low power mode;
   a memory controller which, if the low power mode changes to the normal mode, outputs a preset signal which is to cancel the self-refresh mode;
   a memory interface unit which transmits the preset signal to a signal detector; and
   the signal detector to control the main memory to operate in the normal mode or the low power mode based on two of the preset signal, a control signal, and a mode select signal,
   wherein if the normal mode changes to the low power mode, the memory controller powers off the memory interface unit, and if the low power mode changes to the normal mode and the output of the preset signal is detected by the signal detector, the memory controller powers on the memory interface unit.

2. The image forming apparatus as claimed in claim 1, further comprising CPU;
   wherein if the low power mode changes to the normal mode, the CPU controls the memory controller to output the preset signal.

3. The image forming apparatus as claimed in claim 1, wherein the preset signal is at least one of a clock enable (CKE) signal, a power down exit signal, and a pad enable signal.

4. The image forming apparatus as claimed in claim 1, wherein the memory interface unit is a pad.

5. The image forming apparatus as claimed in claim 3, wherein the pad is a Stub Series Terminated Logic (SSTL) pad, and the signal detector is a SSTL pad hardware (H/W) control logic.

6. The image forming apparatus as claimed in claim 1, wherein the signal detector comprises a multiplexer (MUX) having a plurality of input terminals, and wherein the MUX selects and outputs one of a plurality of input signals input into the plurality of input terminals.

7. A microcontroller, which is connected to an external memory operating in a self-refresh mode if a normal mode changes to a low power mode, the microcontroller comprising:
   a memory controller which, if the low power mode changes to the normal mode, outputs a preset signal which is to cancel the self-refresh mode;
   a memory interface unit which transmits the preset signal to a signal detector; and
   the signal detector to control the main memory to operate in the normal mode or in the low power mode based on two of the preset signal, a control signal, and a mode select signal,
   wherein the memory controller powers off the memory interface unit if the normal mode changes to the power mode and the memory controller powers on the memory interface unit if the low power mode changes to the normal mode and the output of the preset signal is detected by the signal detector.

8. The microcontroller as claimed in claim 7, further comprising CPU;
   wherein if the low power mode changes to the normal mode, the CPU controls the memory controller to output the preset signal.

9. The microcontroller as claimed in claim 8, wherein the preset signal is at least one of a clock enable (CKE) signal, a power down exit signal, and a pad enable signal.

10. The microcontroller as claimed in claim 8, wherein the memory interface unit is a pad.

11. The microcontroller as claimed in claim 10, wherein the pad is a Stub Series Terminated Logic (SSTL) pad, and the signal detector is a SSTL pad hardware (HAW) control logic.

12. The microcontroller as claimed in claim 7, wherein the signal detector comprises a multiplexer (MUX) having a plurality of input terminals, and wherein the MUX selects and outputs one of a plurality of input signals input into the plurality of input terminals.

13. A method for controlling an image forming apparatus, which comprises a main memory which operates in a self-refresh mode if a normal mode changes to a low power mode, a memory controller which outputs a preset signal for cancelling the self-refresh mode if the low power mode changes to the normal mode, and a memory interface unit which transmits the preset signal to a signal detector, the method comprising:

if the normal mode changes to the low power mode, powering off the memory interface unit;
if the low power mode changes to the normal mode, checking whether the preset signal for cancelling the self-refresh mode of the main memory has been output;
if the output of the preset signal is detected, changing the memory interface unit to a power-on state; and
controlling the main memory to operate in the normal mode or the low power mode based on two of the preset signal, a control signal, and a mode select signal.

14. The method as claimed in claim 13, wherein the preset signal is at least one of a clock enable (CKE) signal, a power down exit signal, and a pad enable signal.

15. The method as claimed in claim 13, wherein the memory interface unit is a pad.

16. The method as claimed in claim 15, wherein the pad is a Stub Series Terminated Logic (SSTL) pad.

17. The method as claimed in claim 15, wherein the main controller further comprises a signal detector which detects whether the preset signal has been output,
wherein the signal detector comprises a multiplexer (MUX) having a plurality of input terminals, and wherein the MUX selects and outputs one of a plurality of input signals input into the plurality of input terminals.

18. A method for controlling a microcontroller, which comprises a memory controller which controls an external memory operating in a self-refresh mode if a normal mode changes to a low power mode and a memory interface unit which performs a communication with the external memory and performs a control operation by using the external memory in the normal mode, the method comprising:

if the normal mode changes to the low power mode, powering off the memory interface unit;
if the low power mode changes to the normal mode, and a preset signal is detected, powering on the memory interface unit,
wherein the preset signal is a signal which is output from the memory controller to cancel the self-refresh mode of the external memory if the low power mode changes to the normal mode; and
controlling the main memory to operate in the normal mode or the low power mode based on two of the preset signal, a control signal, and a mode select signal.

19. The method as claimed in claim 18, wherein the preset signal is at least one of a clock enable (CKE) signal, a power down exit signal, and a pad enable signal.

20. The method as claimed in claim 18, wherein the memory interface unit is a pad.

21. The method as claimed in claim 19, wherein the pad is a Stub Series Terminated Logic (SSTL) pad.

22. The method as claimed in claim 18, wherein the microcontroller further comprises a signal detector which detects the preset signal,
wherein the signal detector comprises a multiplexer (MUX) having a plurality of input terminals, and wherein the MUX selects and outputs one of a plurality of input signals input into the plurality of input terminals.

23. At least one non-transitory computer readable recording medium storing computer readable instructions that control at least one controller to implement a method for controlling an image forming apparatus, which comprises a main memory which operates in a self-refresh mode if a normal mode changes to a low power mode, a memory controller which outputs a preset signal for cancelling the self-refresh mode if the low power mode changes to the normal mode, and a memory interface unit which transmits the preset signal to a signal detector, the method comprising:

if the normal mode changes to the low power mode, powering off the memory interface unit;
if the low power mode changes to the normal mode, checking whether the preset signal for cancelling the self-refresh mode of the main memory has been output;
if the output of the preset signal is detected, changing the memory interface unit to a power-on state; and
controlling the main memory to operate in the normal mode or the low power mode based on two of the preset signal, a control signal, and a mode select signal.

24. At least one non-transitory computer readable recording medium storing computer readable instructions that control at least one controller to implement a method for controlling a microcontroller, which comprises a memory controller which controls an external memory operating in a self-refresh mode if a normal mode changes to a low power mode and a memory interface unit which performs a communication with the external memory and performs a control operation by using the external memory in the normal mode, the method comprising:

if the normal mode changes to the low power mode, powering off the memory interface unit; if the low power mode changes to the normal mode, and a preset signal is detected, powering on the memory interface unit,
wherein the preset signal is a signal which is output from the memory controller to cancel the self-refresh mode of the external memory if the low power mode changes to the normal mode; and
controlling the main memory to operate in the normal mode or the low power mode based on two of the preset signal, a control signal, and a mode select signal.

25. The image forming apparatus as claimed in claim 1,
wherein the signal detector selects the normal mode if the mode select is in a first state and the preset signal is transmitted, and
wherein the signal detector selects the low power mode if the mode select is in a second state and a control signal is transmitted.

* * * * *

UNITED STATES PATENT AND TRADEMARK OFFICE
CERTIFICATE OF CORRECTION

| | |
|---|---|
| PATENT NO. | : 9,104,420 B2 |
| APPLICATION NO. | : 13/444180 |
| DATED | : August 11, 2015 |
| INVENTOR(S) | : Jin-kyu Park et al. |

Page 1 of 1

It is certified that error appears in the above-identified patent and that said Letters Patent is hereby corrected as shown below:

In the claims,

Claim 11, Column 16, Line 62

Delete "(HAW)" and insert --(H/W)--, therefor.

Signed and Sealed this
Twenty-fourth Day of November, 2015

Michelle K. Lee
*Director of the United States Patent and Trademark Office*